United States Patent [19]
Visser et al.

[11] Patent Number: 5,265,417
[45] Date of Patent: Nov. 30, 1993

[54] METHOD AND APPARATUS FOR DETERMINING THE HYDROCARBON CONVERSION EFFICIENCY OF A CATALYTIC CONVERTER

[75] Inventors: Jacobus H. Visser, Belleville; Richard E. Soltis, Redford; Eleftherios M. Logothetis, Birmingham; Douglas R. Hamburg, Bloomfield Hills; Jeffrey A. Cook, Dearborn; Margherita Zanini-Fisher, Bloomfield Township, Oakland County, all of Mich.

[73] Assignee: Ford Motor Company, Dearborn, Mich.

[21] Appl. No.: 1,599

[22] Filed: Jan. 7, 1993

[51] Int. Cl.⁵ .................................................. F01N 3/20
[52] U.S. Cl. ........................................ 60/274; 60/276; 60/277
[58] Field of Search .................... 60/274, 276, 277; 123/691; 23/232, 254

[56] References Cited

U.S. PATENT DOCUMENTS

| | | | |
|---|---|---|---|
| 1,957,341 | 5/1934 | Holt | 60/276 |
| 2,013,998 | 9/1935 | Goldsborough | 23/255 |
| 2,197,370 | 4/1940 | Sullivan | 73/190 |
| 2,251,751 | 8/1941 | Minter | 60/276 |
| 2,591,808 | 4/1952 | Guild | 23/232 |
| 3,537,823 | 11/1970 | Innes | 23/232 |
| 3,547,587 | 12/1970 | Innes | 23/232 |
| 3,558,283 | 1/1971 | Freeman et al. | 23/232 |
| 3,560,160 | 2/1971 | Lanneau | 23/232 |
| 3,607,084 | 9/1971 | Mackey et al. | 23/232 |
| 3,674,436 | 7/1972 | Geul | 23/232 |
| 3,687,631 | 8/1972 | Zegel | 23/232 |
| 3,725,005 | 4/1973 | Innes | 23/232 |
| 3,906,721 | 9/1975 | Micheli et al. | 60/276 |
| 3,933,433 | 1/1976 | Hooker | 23/232 |
| 4,070,157 | 1/1978 | Iles | 23/254 |
| 4,099,922 | 7/1978 | Yasuda et al. | 23/254 |
| 4,169,126 | 9/1979 | Iles | 422/95 |
| 4,244,918 | 1/1981 | Yasuda et al. | 422/95 |
| 4,329,873 | 5/1982 | Maeda | 73/190 |
| 4,329,874 | 5/1982 | Maeda | 73/190 |
| 4,614,721 | 9/1986 | Goldberg | 436/147 |
| 5,012,432 | 4/1991 | Stetter et al. | 364/557 |
| 5,177,464 | 1/1993 | Hamburg . | |
| 5,179,833 | 1/1993 | Kuroda et al. | 60/276 |

OTHER PUBLICATIONS

"The Pellistor Catalytic Gas Detector", E. Jones, Solid State Gas Sensors, Dec. 1987.
"Catalytic Devices", S. J. Gentry, Chemical Sensors, Dec. 1988.
"Sensors For Measuring Combustibles in the Absence of Oxygen", J. H. Visser, et al, Sensors and Actuators, Dec. 1992, pp. 233-239.
"Chemical and Physical Sensors Based on Oxygen Pumping with Solid-State Electrochemical Cells", E. M. Logothetis, et al, Sensors and Actuators, Dec. 1992, pp. 183-189.

Primary Examiner—Tony M. Argenbright
Assistant Examiner—M. Macy
Attorney, Agent, or Firm—Roger L. May; Lorraine S. Melotik

[57] ABSTRACT

Disclosed is a method and apparatus for determining the hydrocarbon conversion efficiency of a catalytic converter used in conjunction with an internal combustion (IC) engine to reduce the pollutants contained in the IC exhaust gas comprising the steps of: (a) determining the hydrocarbon content of the IC exhaust gas prior to its entry into the catalytic converter by sampling the exhaust and passing the sample to a catalytic differential calorimetric sensor; (b) contacting the catalyst in the converter with the IC exhaust; (c) determining the hydrocarbon content of the exhaust leaving the catalytic converter by sampling the exhaust and passing the sample to the catalytic differential calorimetric sensor; and (d) comparing the hydrocarbon contents of the exhaust samples from steps (a) and (c) and thereby determining the hydrocarbon conversion efficiency of the catalyst in the converter.

14 Claims, 4 Drawing Sheets

METHOD AND APPARATUS FOR DETERMINING THE HYDROCARBON CONVERSION EFFICIENCY OF A CATALYTIC CONVERTER

TECHNICAL FIELD

The present invention is concerned with methods and devices for monitoring the catalytic converter which is used to reduce the pollutants contained in the exhaust gas from an internal combustion engine.

BACKGROUND ART

The California Air Resources Board (CARB) has required on-board monitoring of the hydrocarbon conversion efficiency of the catalytic converter as part of OBD-II (On-Board Diagnostics phase 2). In SAE papers 900062 and 910561, hereby incorporated by reference, CARB suggests to accomplish this task with dual HEGO (Heated Exhaust Gas Oxygen)/EGO (Exhaust Gas Oxygen) sensor methodologies. By comparing the outputs of the HEGO/EGO sensors placed upstream and downstream of the catalytic converter, a measure of the oxygen storage capacity is obtained, which then must be related to the hydrocarbon conversion efficiency. This relationship turns out to be highly non-linear. Experiments indicate that dual HEGO/EGO sensor methodologies are not very capable of making a measurement of the hydrocarbon conversion efficiency with the required accuracy.

U.S. Pat. No. 3,906,721 teaches a thermoelectric exhaust gas sensor for detecting the content of residual combustibles in the exhaust gas of an internal combustion engine. A sensor is mounted in the exhaust pathway downstream of the catalytic converter utilized in conjunction with the internal combustion engine.

U.S. Pat. Nos. 4,070,157 and 4,169,126 pertain to monitoring the temperature differences between two points separated from each other in the gas stream. One aspect of the '157 patent pertains to a method for the detection of changes in the composition of a stream of gas by disposing a thermometer in the gas stream in contact with or downstream of a catalyst so as to detect changes in the temperature of the catalyst or the gas shortly after it leaves the catalyst, such changes being a function of the amount of gas that reacts under the influence of a catalyst. An alternative procedure is to dispose a second thermometer upstream of the catalyst and to detect the temperature difference between the two thermometers, the difference being a function of the amount of gas, which has reacted under the influence of the catalyst. These devices detect temperatures of gases.

The aforementioned references do not describe the invention described herein nor teach the objects of the present invention.

It is an object of the present invention to determine the hydrocarbon conversion efficiency of a catalytic converter utilized in conjunction with an internal combustion (IC) engine by utilizing a catalytic differential calorimetric sensor that is operable for short periods of time to perform the appropriate testing.

It is a further object of the present invention to describe an apparatus which samples the exhaust gas upstream and downstream of the catalytic converter for short periods of time to permit a catalytic differential calorimetric sensor to determine the hydrocarbon conversion efficiency of the catalytic converter. This catalytic differential calorimetric sensor is on-board the vehicle driven by an IC engine.

SUMMARY OF THE INVENTION

A method for determining the hydrocarbon conversion efficiency of a catalytic converter, which is placed in the exhaust gas of an internal combustion engine to reduce the pollutants, comprising the steps of:
  a. determining the hydrocarbon concentration of the exhaust gas upstream of the catalytic converter by sampling the exhaust gas and passing the sample to a catalytic differential calorimetric sensor;
  b. contacting the catalyst in the converter with the IC exhaust gas;
  c. determining the hydrocarbon concentration of the exhaust gas downstream of the catalytic converter by sampling the exhaust gas and passing the sample to the catalytic differential calorimetric sensor; and
  d. comparing the hydrocarbon content of the exhaust gas samples from steps (a) and (c) and thereby determining the hydrocarbon conversion efficiency of the catalytic converter.

Also described is an apparatus for determining the hydrocarbon conversion efficiency of the catalytic converter comprising a sampling means for obtaining a sample from the exhaust gas upstream of the catalytic converter, a sampling means for obtaining a sample from the exhaust gas downstream of the catalytic converter, and a catalytic differential calorimetric sensing device to measure the hydrocarbon concentrations in both samples, thereby determining the hydrocarbon conversion efficiency of the catalytic converter.

DESCRIPTION OF THE PREFERRED EMBODIMENT

The present invention is concerned with a vehicle on-board method for determining the hydrocarbon conversion efficiency of a catalytic converter. This catalytic converter is placed in the exhaust gas of an internal combustion engine to reduce pollutants. The present invention is concerned with directly measuring the hydrocarbon concentrations in the exhaust gas and thereby determining the conversion efficiency. This is performed by utilizing a catalytic differential calorimetric sensor, which can measure hydrocarbons. Measurements are performed on exhaust gas samples upstream and downstream of the catalytic converter.

Figure 1:
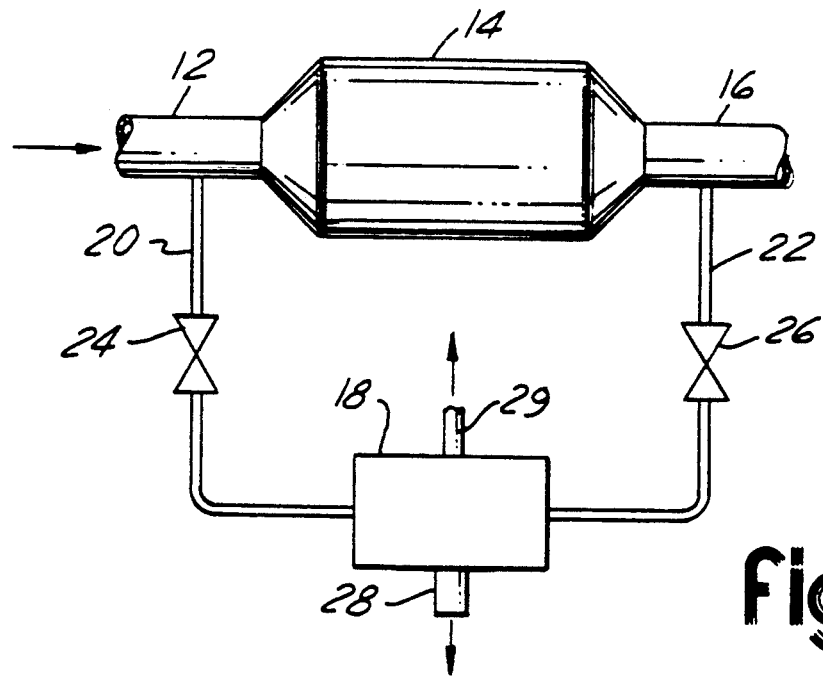
FIG. 1 is a schematic representation of a sampling system of the present invention.

FIG. 1 is a schematic representation of the present invention where exhaust gas from the internal combustion engine is fed to the inlet 12 of a catalytic converter 14. The catalytic converter has an outlet 16 which directly leads to the exhaust pipe. The catalytic converter is one that will catalyze the exhaust gas from an internal combustion engine in order to reduce the pollutants that are present in the exhaust gas from the engine. In the preferred embodiment, sensor 18 is positioned to receive samples via conduit 20 from the inlet to the catalytic converter and via conduit 22 from the exhaust from the catalytic converter. Suitable valves 24 and 26 are positioned in the conduits 20 and 22, respectively. These valves are opened during the desired test period.

The length and design of the sample lines 20 and 22 could be chosen to provide adequate cooling of the exhaust gas samples if desired to prevent heat damage to the valves 24 and 26 and the sensor 18.

The testing procedure would be one where after the catalytic converter and engine have warmed up, the monitoring would then take place. The simplest case is to determine the hydrocarbon conversion efficiency under steady state engine operation, i.e. during idle or during a period of constant speed and load. If the on-board computer determines that all conditions for catalytic converter monitoring are met, valve 24 would be opened and sensor 18 would determine the hydrocarbon concentration in the exhaust gas upstream of the catalytic converter. The sensor output would be fed into the on-board computer, valve 24 would be closed, valve 26 would be opened and sensor 18 would determine the hydrocarbon concentration in the exhaust gas downstream of the catalytic converter. The output of sensor 18 would be fed into the on-board computer and valve 26 would then be closed. The on-board computer would then be able to determine the hydrocarbon conversion efficiency of the catalytic converter by taking the ratio of the hydrocarbon concentrations upstream and downstream of the catalytic converter.

In a more complicated case, the hydrocarbon conversion efficiency of the catalytic converter would not be determined under steady state conditions of engine operation, but over (for example) the FTP (Federal Test Procedure) hot cycle. This testing procedure would also take place after the catalytic converter and engine have warmed up. The on-board computer would continuously monitor the engine rpm, engine torque, fuel flow rate, and mass air flow rate. The hydrocarbon concentrations upstream and downstream of the catalytic converter would be measured alternately as described above and also fed into the on-board computer. The measured concentrations would be used to calculate the equivalent mass emissions upstream and downstream of the catalytic converter in each rpm/torque cell for operation of the vehicle over the FTP hot cycle. These mass emissions would then be multiplied by a time-weighted factor which represents the amount of time the vehicle would spend in each rpm/torque region if it were operated over the FTP hot cycle. Finally, a summation of all time-weighted mass emissions from all rpm/torque cells of the storage table would be performed. In this way, the upstream and downstream hydrocarbon mass emission emitted over the FTP hot cycle would be obtained. The on-board computer could then calculate the catalytic conversion efficiency by comparing the upstream mass emissions with the downstream mass emissions.

In both measurement procedures, described above, the on-board computer would decide, after one or more measurements during one or more trips, whether the catalytic converter efficiency has decreased below a certain value. In such a case, a dashboard light could be turned on to notify the driver of the vehicle.

It is to be appreciated that the sampling frequency for controlling the valves 24 and 26 would be chosen to be consistent with the frequency response of the catalytic differential calorimetric sensor as well as with the overall time permitted for the catalytic converter test. A sampling frequency might typically be 1 Hz.

Advantages of the present invention are that the catalytic differential calorimetric sensor would be operated for only a short period of time, for example 10–60 seconds, during each driving cycle of the vehicle. Further, very low sampled gas flow rates would be required for proper operation of the invention. As a consequence, deterioration of the sensor due to prolonged exposure to exhaust gases would be decreased. The location of the sensor outside the exhaust pipe also allows for control of temperature and gas flow, which may be necessary for proper operation of sensor 18. It also allows for adding air into conduits 20 and 22 (either before or after valves 24 and 26) to ensure enough oxygen is present for proper operation of the catalytic differential calorimetric sensor. Although the sensor is expected to deteriorate much slower than the catalytic converter it is supposed to monitor, some deterioration of the sensor is acceptable, because the present invention results in a ratio of two measurements instead of an absolute concentration of hydrocarbons in the exhaust gas. Since the sample flow rates would be low, the outlet of sensor 18 could be exhausted directly into the atmosphere through conduit 28 with negligible effects on the vehicle emissions. Alternatively, the outlet of sensor 18 could be fed through conduit 2 g back into the engine intake manifold via outlet 29 without affecting operation of the engine to any degree.

An alternative way to detect the hydrocarbon conversion efficiency of the catalytic converter would be to place a catalytic differential calorimetric sensor in exhaust gas stream 12 and catalytic differential calorimetric sensor in exhaust gas stream 16. The outputs from the sensors could then be fed into the on-board computer, which would then calculate the ratio to determine the efficiency of the catalytic converter. The sensors can be placed directly into the exhaust stream or just outside with conduits and valves. In the latter case, the valves would only be opened during the test cycle, which would thereby decrease the time the sensors would be exposed to the exhaust gases generated by the internal combustion engine.

Having described alternative ways in which the catalytic differential calorimetric sensors could be utilized, we now turn to a discussion of the sensors.

Figure 2:
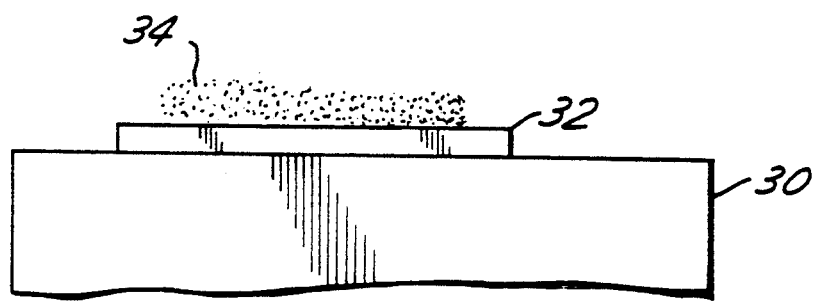
FIG. 2 is a schematic representation of the catalytic calorimetric sensor utilized in the invention described herein.

In a catalytic calorimetric gas sensor, a catalytic layer, deposited on an appropriate substrate, enables the oxidation of combustibles (such as hydrocarbons, carbon monoxide, and hydrogen). The heat generated by this oxidation raises the temperature of the substrate which is measured as a change in electrical resistance of an appropriate resistor material on the same substrate. Catalytic calorimetric sensors generally operate at 200°–500° C. FIG. 2 is a cross-sectional diagram of a catalytic calorimetric gas sensor having substrate 30 which has a resistor 32 suitably placed on top. Onto the resistor is placed a catalytic layer 34. The substrate would be as thin as possible and would be comprised of materials with a low heat conductivity, preferably ceramic materials, such as for example aluminum oxide, silicon oxide or silicon nitride. The resistor is comprised of desirable materials such as platinum. The catalyst that would be utilized would generally be precious metal catalysts used alone or in combination with a proper catalyst support. The precious metals are generally platinum, palladium, rhodium, and the like.

Figure 3:
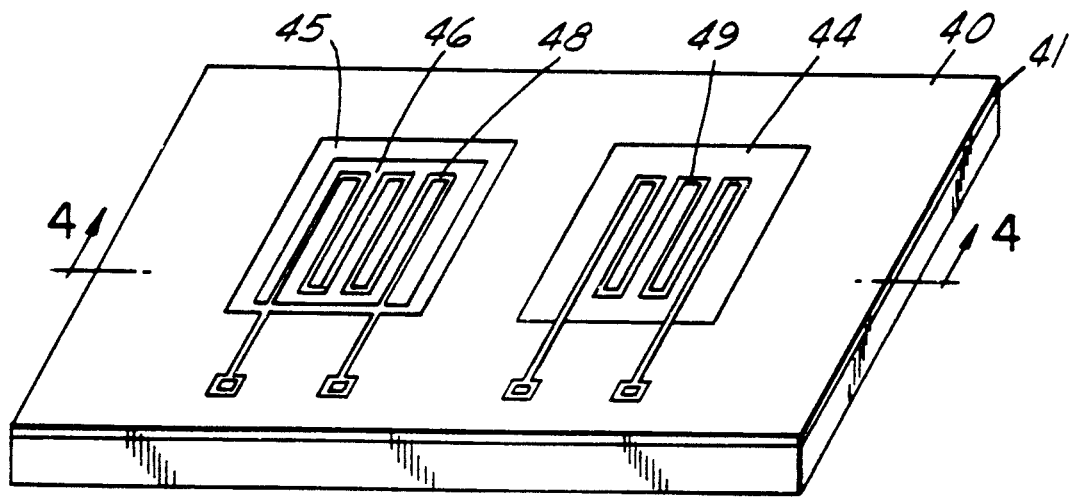
FIG. 3 is an alternative embodiment of the catalytic differential calorimetric sensor useful in the invention described herein.
Figure 4:
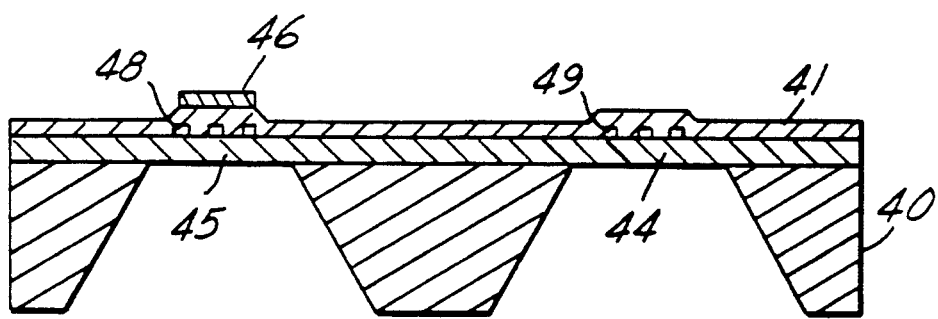
FIG. 4 is a cross-section of FIG. 3 taken along lines 4—4.

Various types of catalytic calorimetric sensors have been described in the literature. FIG. 3 is a perspective view of one alternative of a catalytic differential calorimetric sensor having a silicon substrate 40 with two membranes 44 and 45 with resistor elements 48 and 49 placed on top of the membrane. These resistor elements are covered by a dielectric layer 41. A catalytic layer 46 is placed on top of membrane 45 (and resistor element 48 and the dielectric layer 41). The resistor element 49 on membrane 44 is used to measure the temperature of the surrounding gas, while resistor element 48 on membrane 45 measures the additional heat generated by the oxidation reactions on the catalytic layer 46. Both membranes are thermally isolated from each other, because they have a low thermal conductivity and the silicon substrate is a good heat sink. The resistor elements 48 and 49 could be part of a Wheatstone bridge, in which case the sensor output is directly proportional to the amount of combustibles in the gas. An alternative method of operating the sensor is to heat the membranes to a set temperature by passing currents through the resistor elements 48 and 49. The difference in both currents would then be a measure for the amount of combustibles present in the gas. The various methods of operating catalytic (differential) calorimetric sensors are well known and have been described in, for example, "Calorimetry: Fundamentals and Practice" by W. Hemminger (1984), hereby incorporated by reference. The membranes 44 and 45 are typically 1 micrometer in thickness and 1 mm in width and are made of a composite structure of silicon oxide and silicon nitride to reduce residual stress. The temperature sensitive resistor elements 48 and 49 are typically made of a sputtered platinum film patterned by lithography and a chemical etch. A cross-sectional view of the sensor of FIG. 3 taken along the lines 4—4 is shown in FIG. 4. A catalytic differential calorimetric gas sensor similar to FIGS. 3 and 4 has been described in "Sensors and Actuators B", 533-538, 4 (1991), M. Gall, hereby incorporated by reference.

Catalytic layers that may be applied to the catalytic differential calorimetric sensor may be deposited by a variety of techniques such as sputtering, evaporation (E-gun) or by applying a paste. The last technique has been described in "Detection of Methane/Butane Mixtures in Air By A Set of Two Micro Calorimetric Sensors", Sensors and Actuators B, 6 (1992), 262-265, by V. Summer, R. Rongen, P. Tobias, and D. Kohl, hereby incorporated by reference. There is some indication that sputtering or evaporation of a thin catalytic film may result in a layer of less surface area and thereby decreased oxidation of hydrocarbons. Paste such as discussed in the 1992 Sensors and Actuators B reference, supra, generally result in high surface area.

Figure 5:
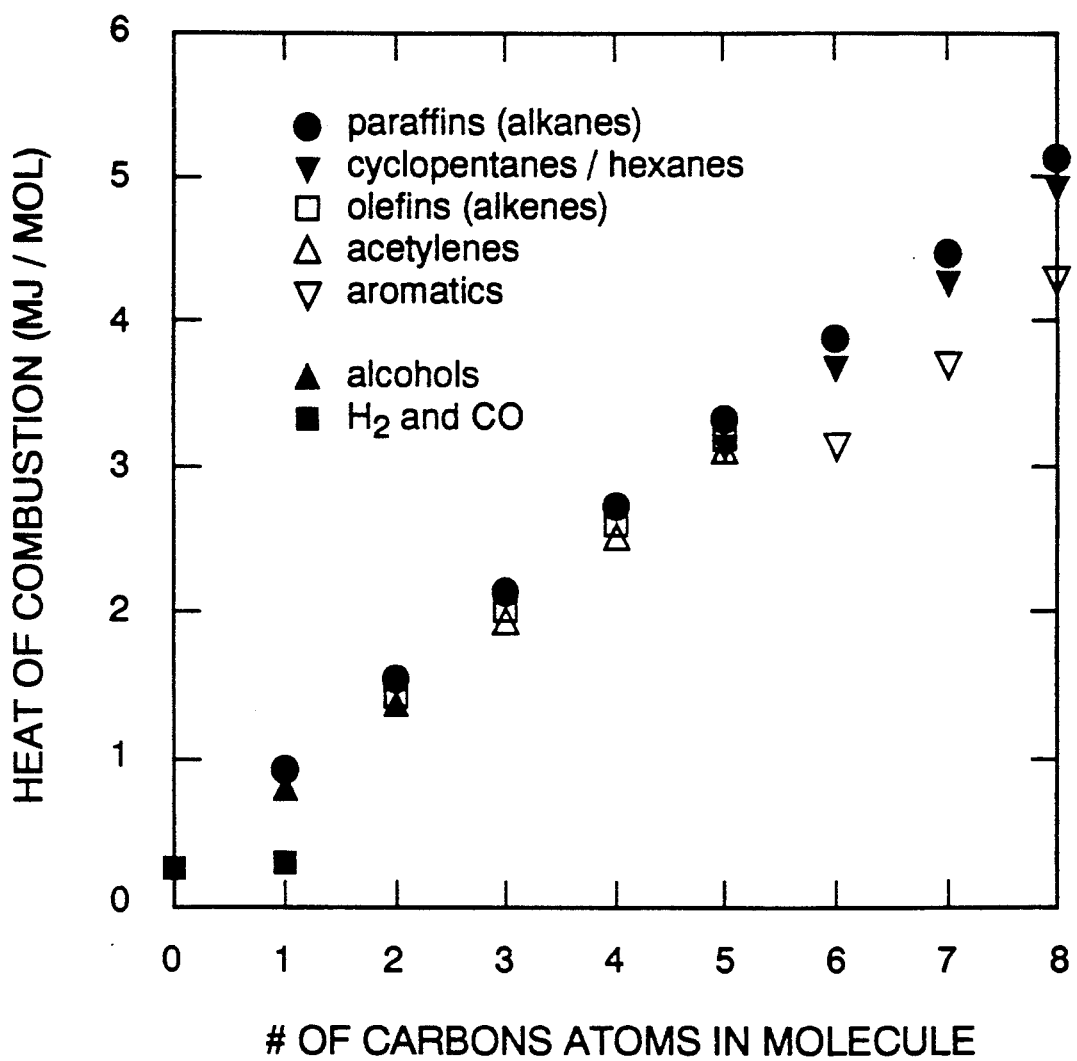
FIG. 5 is the heat of combustion of a number of combustibles as a function of the number of carbon atoms in the molecule.

In general, catalytic differential calorimetric gas sensors are total-combustibles sensors. FIG. 5 shows the heat of combustion of various combustibles as a function of the number of carbon atoms in the molecule. The catalytic calorimetric sensor could be used as a hydrocarbon sensor if the hydrocarbon concentration is approximately equal or larger than the hydrogen and carbon monoxide concentrations, since the heat of combustion of carbon monoxide and hydrogen is much smaller than the heat of combustion of hydrocarbons. It is assumed that the sensor oxidizes hydrocarbons approximately as efficiently as carbon monoxide and hydrogen. FIG. 5 also shows that the output signal of the sensor would then be a function of the number of carbon atoms in the hydrocarbon molecule. In a mixture of various hydrocarbons, the output of the catalytic calorimetric sensor would be proportional to the number of carbon atoms. If the hydrocarbon concentrations are small compared to carbon monoxide and hydrogen concentrations, a hydrocarbon sensor could still be obtained by having a catalyst that is more selective toward oxidation of hydrocarbons. Alternatively, the access of carbon monoxide or hydrogen to the catalyst should be limited by, for example, a filter. Along the same lines, a catalytic differential calorimetric gas sensor that is selective toward carbon monoxide could be obtained.

Figure 6:
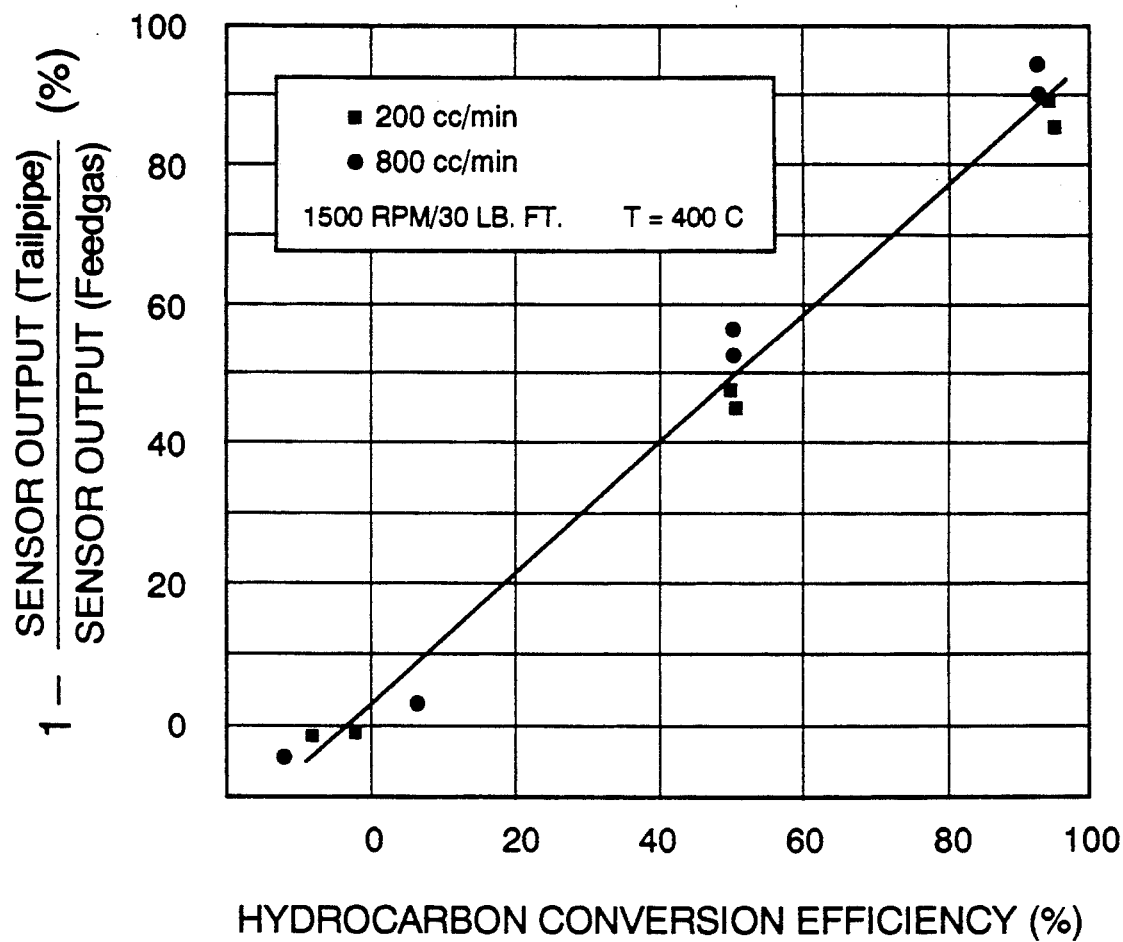
FIG. 6 is a graph plotting the sensor output on a percent basis versus the hydrocarbon conversion efficiency (in percent) at different exhaust gas flow rates for three different catalysts.

Testing of the principle has been performed utilizing an engine-dynamometer with a 5.0 liter V8 engine run at stoichiometry at 1500 rpm and 30 ft.lbs. In this engine, the hydrocarbon concentrations were about equal to the carbon monoxide concentrations and larger than the hydrogen concentrations. Exhaust gas from the engine was taken upstream and downstream of the catalytic converter and measured by both laboratory instrumentation (an FID, Flame Ionization Detector) and by a commercially available catalytic differential calorimetric sensor. A total of three catalysts with various catalytic hydrocarbon conversion efficiencies (approximately 0, 50 and 95%) were tested. The ratio of downstream and upstream steady state hydrocarbon concentrations as measured by the laboratory instrumentation is plotted along the X-axis in FIG. 6. The same ratio, but measured by the catalytic calorimetric sensor, is plotted along the Y-axis. As FIG. 6 shows, a good agreement between both measurements has been obtained. Although the output of the catalytic differential calorimetric sensor depends on the flow rate, this flow rate dependency disappears to a large extent (for flow rates of 200 and 800 cc/min) once the ratio of downstream and upstream measurements is taken. The temperature of the catalytic differential calorimetric sensor was accurately controlled at 400° C. This engine-dynamometer test thus shows that indeed the output of a calorimetric sensor can be correlated to the catalyst hydrocarbon conversion efficiency (as measured with an FID).

It is to be appreciated that the relative concentrations of combustibles in the exhaust gas from an internal combustion engine will vary depending on engine and vehicle, especially with trucks as opposed to cars. Therefore, to measure hydrocarbons with a catalytic differential calorimetric sensor, this sensor has to be tailored to a particular group of engines or vehicles.

It should also be possible to fabricate a sensor array capable of measuring hydrocarbons. Especially in silicon, this could easily be constructed by incorporating more membranes covered with various catalytic materials. A suitable computer algorithm then evaluates the outputs from the sensor array.

For operation of the catalytic calorimetric gas sensors, oxygen might not be sufficiently present in the exhaust gas. One method of adding oxygen into sensor 18 is the use of oxygen pumping with zirconia electrochemical cells. See, Sensors For Measuring Combustibles In The Absence Of Oxygen, Transducers, 1991, pp. 555-557, J.H. Visser, R.E. Soltis, L. Rimai, E.M.

Logothetis, hereby incorporated by reference. See also, Chemical And Physical Sensors Based On Oxygen Pumping With Solid State Electrochemical Cells, by E.M. Logothetis, J.H. Visser, R.E. Soltis, L. Rimai, Sensors and Actuators, July 1992, hereby incorporated by reference.

The present invention describes methods and an apparatus to determine the hydrocarbon conversion efficiency of a catalytic converter. A similar method (with appropriate catalytic differential calorimetric sensors) could be used to determine the carbon monoxide conversion efficiency of a catalytic converter.

While the forms of the invention herein disclosed constitute presently preferred embodiments, many others are possible. It is not intended herein to mention all of the possible equivalent forms or ramifications of the invention. It is understood that the terms used herein are merely descriptive rather than limiting and that various changes may be made without departing from the spirit or scope of the invention.

We claim:

1. A method for determining the hydrocarbon conversion efficiency of a catalytic converter, which is placed in the exhaust gas of an internal combustion (IC) engine to reduce the pollutants, comprising the steps of:
   a. determining the hydrocarbon concentration of the exhaust gas upstream of the catalytic converter by sampling the exhaust gas and passing the sample to a catalytic differential calorimetric sensor;
   b. contacting the catalyst in the converter with the IC exhaust gas;
   c. determining the hydrocarbon concentration of the exhaust gas downstream of the catalytic converter by sampling the exhaust gas and passing the sample to the catalytic differential calorimetric sensor; and
   d. comparing the hydrocarbon content of the exhaust gas samples from steps (a) and (c) and thereby determining the hydrocarbon conversion efficiency of the catalytic converter.

2. The method of claim 1 wherein the sampling is performed in a period of time less than five seconds.

3. The method of claim 1 wherein there is one catalytic differential calorimetric sensor for sampling steps (a) and (c).

4. The method of claim 1 wherein a first catalytic differential calorimetric sensor is placed in the exhaust from the internal combustion engine and before the IC exhaust gas entry into the catalytic converter and a second catalytic differential calorimetric sensor is placed in the exhaust from the catalytic converter.

5. The method of claim 1 wherein the catalytic differential calorimetric sensor is one that contains a precious metal.

6. The method of claim 5 wherein the precious metal is selected from the group consisting of platinum, palladium, silver, gold, ruthenium, rhodium, osmium, iridium, and mixtures thereof.

7. The method of claim 6 wherein the catalyst is placed in IC exhaust gas contacting relationship with a silicon substrate.

8. An on-board apparatus for determining the catalytic hydrocarbon conversion efficiency of a catalytic converter which is placed in the exhaust gas of an internal combustion (IC) engine, the exhaust of which is fed to a catalytic converter to reduce the pollutants contained in the exhaust comprising a sampling means for obtaining a sample from the exhaust from the internal combustion engine prior to its entry into the catalytic converter, a sampling means for obtaining a sample from the exhaust gas from the catalytic converter and a catalytic differential calorimetric sensing device to measure the hydrocarbon content from both samples, thereby determining the hydrocarbon conversion efficiency of the catalytic converter.

9. The apparatus of claim 8 wherein the sampling is performed in a period of time less than five seconds.

10. The apparatus of claim 8 wherein there is one catalytic differential calorimetric sensor for sampling the internal combustion engine exhaust prior to entry into the catalytic converter and exhausting from the catalytic converter.

11. The apparatus of claim 8 wherein a first catalytic differential calorimetric sensor is placed in the exhaust from the internal combustion engine and before the IC exhaust entry into the catalytic converter and a second catalytic differential calorimetric sensor is placed in the exhaust from the catalytic converter.

12. The apparatus of claim 8 wherein the catalytic differential calorimetric sensor is one that contains a precious metal.

13. The apparatus of claim 12 wherein the precious metal is selected from the group consisting of platinum, palladium, silver, gold, ruthenium, rhodium, osmium, iridium, and mixtures thereof.

14. The apparatus of claim 13 wherein the catalyst is placed in IC exhaust gas contacting relationship with a silicon substrate.

* * * * *